US006007778A

United States Patent [19]
Cholewa

[11] Patent Number: 6,007,778
[45] Date of Patent: Dec. 28, 1999

[54] HERMETIC REACTION TUBE FOR SPECTROSCOPY

[75] Inventor: Olivia M. Cholewa, Madison, Wis.

[73] Assignee: Wisconsin Alumni Research Foundation, Madison, Wis.

[21] Appl. No.: 09/045,126

[22] Filed: Mar. 20, 1998

[51] Int. Cl.$^{6}$ ............................ G01N 21/03; G02B 21/00

[52] U.S. Cl. ........................ 422/82.05; 422/102; 356/246

[58] Field of Search ................................ 422/82.05, 102; 356/244, 246; 436/164, 165, 171

[56] References Cited

U.S. PATENT DOCUMENTS

| | | | |
|---|---|---|---|
| 1,906,345 | 5/1933 | Waller . | |
| 2,026,267 | 12/1935 | Brandlin . | |
| 3,912,452 | 10/1975 | Sodickson et al. | 356/246 |
| 5,244,637 | 9/1993 | Pratellesi et al. | 422/102 |
| 5,267,087 | 11/1993 | Weidemann | 422/82.05 |
| 5,408,313 | 4/1995 | Ponstingl et al. | 356/246 |
| 5,492,674 | 2/1996 | Meserol | 422/82.05 |
| 5,572,370 | 11/1996 | Cho | 422/82.05 |

OTHER PUBLICATIONS

P. 59 from Edmund Scientific Catalog showing sapphire lenses (admitted prior art).

Web page from Brinkman Instruments, Inc. showing Eppendorf Microcentrifuge Tubes (admmitted prior art).

*Primary Examiner*—Gary K. Graham
*Attorney, Agent, or Firm*—Quarles & Brady

[57] ABSTRACT

A reaction tube includes a resealable cap containing a lens. The body of the tube is translucent to admit spectrographic analysis light to pass through an internal reactant and to be collected by the lens eliminating the need to open the tube and expose the reactants to contamination from atmospheric agents during spectrographic analysis. The material of the tube is selected to permit necessary heating and centrifuging needed in DNA/RNA/protein reactions synthesis applications and to corral the reactants along a predetermined optical axis.

10 Claims, 1 Drawing Sheet

FIG. 1
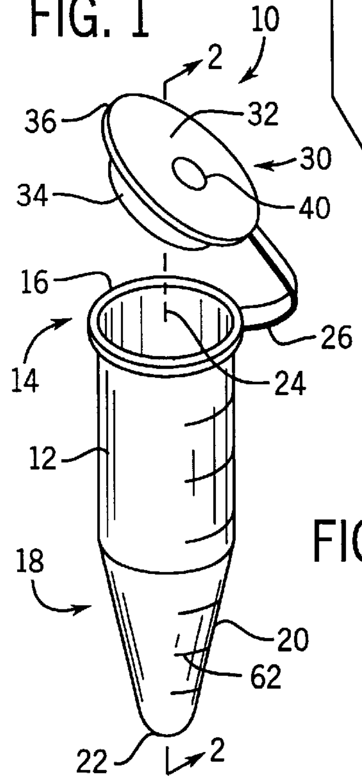
FIG. 2
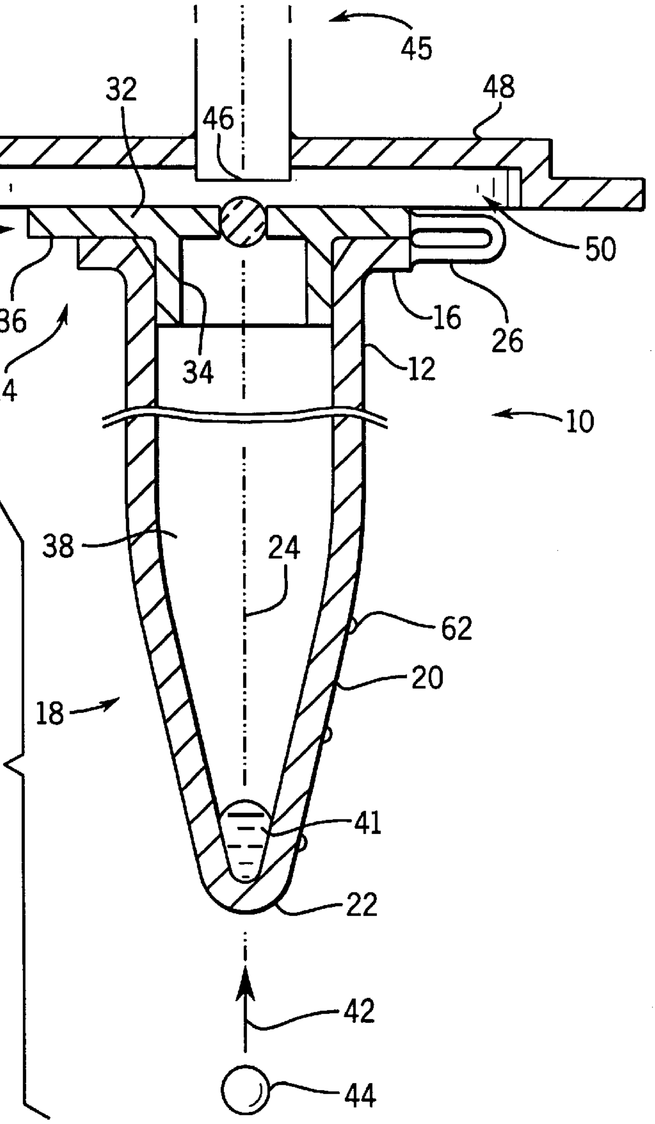
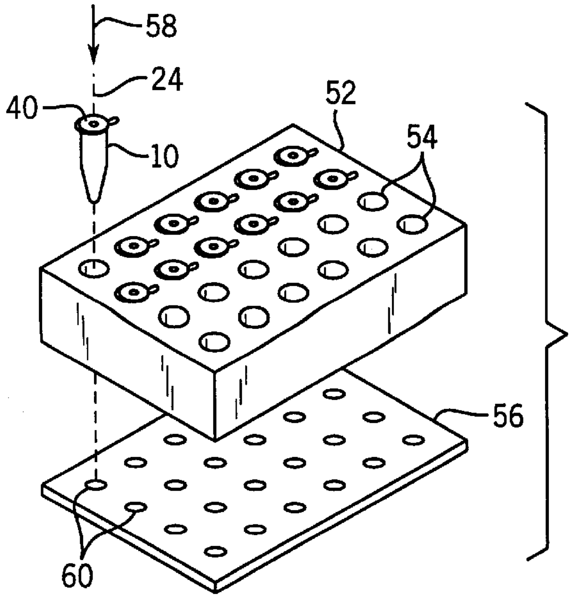
FIG. 3

HERMETIC REACTION TUBE FOR SPECTROSCOPY

BACKGROUND OF THE INVENTION

The present invention relates to lab-ware suitable for containing chemical reactants during processing and in particular to a reaction vessel that may remain sealed during spectroscopic or other optical absorptiometry measurements.

In genetic research, RNA (ribonucleic acid) synthesis reactions may be conducted, during which, it is imperative that the RNA be shielded from the RNA destroying enzyme RNase. The RNase enzyme operates catalytically, that is, it is not consumed in the reaction which destroys the RNA, thus even small amounts of RNase can wreak havoc on the RNA being synthesized. Accordingly, lab-ware used in such experiments must be carefully cleaned to ensure it is free from RNase and the reactants must be shielded from the environment, including the atmosphere, in which naturally occurring RNase abounds.

Typically, during RNA synthesis reactions, it is necessary to sample the reactants to determine whether the desired levels of concentration of RNA have been reached. This may be done by removing a small sample of the reactants and placing it in an ultraviolet spectrometer to measure the absorption of ultraviolet light in wavelengths from 260 to 280 nm. Ideally, a small amount of sample is removed for measurement and then diluted to the necessary volume needed to occlude the spectrometer beam. The dilution and the exposure of the sample to contamination prevents the sample from being returned to the reacting vessel after measurement has been made. The preparation of the sample is time consuming and cumbersome, wastes valuable reactant and exposes the reactants to environmental contamination.

SUMMARY OF THE INVENTION

The present invention provides a reaction vessel suitable for processing materials that must be spectrographically measured and which are susceptible to contamination from the environment. The reaction vessel is translucent and includes a cap having a lens to allow the vessel to remain sealed during spectrographic analysis. The shape of the vessel concentrates the reactants along an optical axis of the lens.

Specifically, the present invention provides a reaction vessel in the form of a translucent tube having walls defining an interior volume open at one end. A cap sized to removably seal the open end of the tube contains an aperture holding a lens element. The lens element is oriented so that when the cap is in place on the tube, light may pass along a central axis through the walls, the interior volume of the tube, and the lens element.

Thus, it is one object of the invention to provide a reaction vessel allowing the spectroscopic analysis of its contents without the need to remove samples from its contents or to expose the contents to environmental contamination.

The walls of the tube opposed to the open end may taper toward the central axis as they extend away from the open end.

Thus, it is another object of the invention to provide a reaction vessel that, when centrifuged, will concentrate small volumes of reactants along the optical axis for measurement.

The outer surface of the lens element may conform to the surface of a sphere and may be sapphire or other refractive lens material such as glasses, plastics and quartz.

It is another object of the invention, therefore, to provide a simple lens element that is resistant to abrasion and the reactants contained within the vessel and which may be readily sealed to an opening in the cap. The spherical lens element may be sealed to a polymer cap by a simple press-fit that deforms the aperture walls about the lens's equator, the region of sealing always lying in a plane aligned perpendicularly with the axis of the aperture. Because the lens is spherical, alignment of the optical axis of the lens, critical for most lens shapes, is not required.

It is another object of the invention to provide for a collimating lens that permits a hand-held detector to be easily and repeatedly located with respect to the tube by touching the detector to the lens surface. The short focal length of a spherical lens allows a photoelectric detector to contact the lens surface for a simple and repeatable measurement.

The reaction vessel may be molded of a thermoplastic polymer such as of polypropylene or polystyrene.

Thus, it is another object of the invention to provide for a relatively inexpensive, non-reactive and easily fabricated reaction vessel which may be pre-cleaned and disposed of after use to further assist in avoiding contamination.

The invention may further include an alignment block having spaced channels sized to receive the outside surfaces of the walls of a plurality of tubes, the channels allowing the passage of light along the central axis of the tubes between a bottom and top of the alignment block.

Thus, it is another object of the invention to provide a system of reaction vessels suitable for use with conventional automated spectroscopy equipment. The block holds the reaction vessels in a regular spacing suitable for use with such equipment while providing a path of light for the spectroscope. Each tube may be removable so that their reaction conditions, prior to spectroscopy, may be individually adjusted.

The foregoing and other objects and advantages of the invention will appear from the following description. In this description, reference is made to the accompanying drawings which form a part hereof, and in which there is shown by way of illustration the preferred embodiment of the invention. Such embodiment does not necessarily represent the full scope of the invention, however, and reference must be made therefore to the claims for interpreting the scope of the invention.

BRIEF DESCRIPTION OF THE SEVERAL VIEWS OF THE DRAWINGS

FIG. 1 is a perspective view of the reaction vessel of the present invention showing an integrally molded tube and cap;

FIG. 2 is a cross-sectional view of FIG. 1 taken along line 2—2 showing the cap sealed to the tube, the tapering of the inner walls along a central axis aligned with the lens element positioned in the cap, and showing the position of a light source detector for manual spectrographic readings; and FIG. 3 is a perspective view of an alignment block for receiving a plurality of tubes of FIG. 1 for positioning them with respect to a film plate or automated spectroscopy equipment.

DETAILED DESCRIPTION OF THE PREFERRED EMBODIMENT

Referring now to FIG. 1, a reaction vessel 10 constructed according to the present invention includes a cylindrical tube 12 radially symmetric about an axis 24. The tube has an upper, open end 14 presenting a circular lip 16 and a lower closed end 18 terminating in a conical portion 20 at which walls of the reaction vessel 10 converge about the axis 24 to an apex 22 aligned with the axis 24.

Extending radially from the lip 16 is a live hinge 26 further connected to a top disk 32 of a cap 30. The top disk 32 is a circular plate of outside diameter equal to that of the lip 16. Attached to a lower surface of the top disk 32 is a downwardly extending flange 34.

As shown in FIG. 2, the cap 30 may be used to seal the open end 14 of the tube 12 with the top disk 32 adjacent to the lip 16. In this position, the flange 34 is compressed inward by the inner surface of the tube 12 just below the lip 16 to shielding the inner volume 38 of the reaction vessel 10 from outside contamination. A thumb flange 36 extending radially from the top disk 32 opposite the point of attachment of the top disk 32 to the live hinge 26, may be used to unseal the tube 12 by a pressing upward on the flange.

The tube 12 and cap 30 may be preferentially molded in a single unit of a thermoplastic and chemically inert polymer such as polystyrene, polypropylene, or polyethylene. Resealable tubes 12, as generally described above, are commercially available from a wide variety of laboratory supply companies under the tradename Eppendorf or the generic name of micro-centrifuge tubes.

Referring to FIGS. 1 and 2, a lens 40 is positioned within an aperture cut in the top disk 32 and extending wholly through the cap 30. In the preferred embodiment, the lens 40 is a four millimeter optical sapphire ($Al_2O_3$) sphere centered along axis 24 so as to provide a light path along the axis 24 and through the cap 30. Other sizes of spheres may also be used; the preferred range is 1–5 mm. When the cap 30 is constructed of a plastic material such as polypropylene, the lens 40 may be sealed within the aperture by plastic deformation of the material of the cap 30 through which the aperture is cut. The aperture is thus formed to be smaller than the diameter of the lens 40. The sapphire lens 40 provides good optical transmission for ultraviolet light in a region of interest from approximately 260 to 280 nm such as is valuable in detecting RNA, DNA and protein concentrations.

When the reaction vessel 10 is oriented so that the axis 24 is vertical with the open end 14 opening upward, reactants 41 contained in the inner volume 38 of the reaction vessel 10 will collect at a point along the optical axis 24 above the apex 22. This collection may be promoted by use of a centrifuge. Spectrographic light 42 from a spectrographic source 44 passing upward along the axis 24 will then pass through the apex 22 of the closed end of the tube along the optical axis 24 to be collimated by the lens 40.

A property of spherical lenses is that their focal point is immediately adjacent to the surface of the lens 40 and thus the upper lens surface can serve to locate a hand-held photodetector 45. The detecting surface 46 of the photodetector 45 is placed against the upper surface of the lens 40 to obtain a consistent collimated light signal for measurement. A shroud 48 may be attached to the photodetector 45 having a receiving portion 50 adapted to fit over the cap 30, thus to center the detecting surface 46 above the lens 40 and to shield the measurement from ambient light.

During use of the reaction vessel 10, reactants 41 may be introduced into the tube 12 and the cap 30 sealed to the tube 12 by pressure downward on the cap 30. From this time, the contents of the tube 12 are shielded from outside contamination such as from RNase and may be heated, mixed, shaken, vortexed and cooled as necessary to promote the desired reaction. The reaction vessel 10 may be then placed in a centrifuge to concentrate the reactants 41 at the apex 22 permitting the measurement of extremely small amounts of reactant 41. The tube may then be placed above the spectrographic source 44 and the measurement made with the photodetector 45 being held against the lens 40 without removal of the cap 30 or the extraction of a portion of the reactants 41 for external measurement.

Referring now to FIG. 3, a carrier block 52 may be provided having a series of cylindrical bores 54 passing through an upper and lower surface of the block 52 so as to provide an unobstructed passage of light there along. The size of the bores 54 is such as to receive the outer surfaces of the reaction vessels 10 with their axis 24 aligned with the axes of the bores 54. Such a block 52 may adapt the reaction vessels 10 of the present invention for use in automatic spectroscopy equipment, in lieu of a microplate or the like. In such equipment, light passes upward through the block 52 holding the reaction vessels 10, and the detector scanned over the top of the lenses 40 at a consistent distance.

Alternatively, the block 52 may be used in conjunction with a photographic film 56 by placing the block 52 with its reaction vessels 10 upon the film 56 and passing light 58 downward through the lenses 40 of the reaction vessels 10 to be recorded as exposure spots 60. The film creates a qualitative comparison of the attenuation of light 58 by the reactants 41 within the reaction vessels 10 indicated by the optical density of each spot 60 on the photographic film 56.

It will be understood that the attenuation measurement will be affected by the material of the tube 12 and the collimating properties of the lens 40. These effects are compensated for by readings taken of a standard reactant to compare against the unquantified reactant 41 in the measurement process. As shown in FIGS. 1 and 2, the outside of the tube 12 may include graduations 62 so that the volume of the reactant 41 may be held constant and equal to the standard. The conical shape of the conical portion 20 of the tube 12 provides increasing accuracy in the graduations 62 as a result of the declining cross-section for small amounts of reactant 41.

The above description has been that of a preferred embodiment of the present invention. It will occur to those that practice the art that many modifications may be made without departing from the spirit and scope of the invention. For example, the lens 40 may be integrally molded from the same material as that of the tube or may be fabricated from other materials than sapphire or with other focal lengths commensurate with the demands of the optics of the particular spectrographic instrument and the particular wavelength range being investigated. The cap 30 instead of snapping onto the tube 30 may be a screw-type cap. In order to apprise the public of the various embodiments that may fall within the scope of the invention, the following claims are made.

I claim:

1. A reaction vessel comprising:

a translucent tube having walls defining an interior volume open at one end;

a cap sized to removably seal the open end of the tube, the cap containing an aperture holding a lens element sealing the aperture, the lens element oriented, when the cap is in place on the tube, to allow passage of light along a central axis from a spectrometer light source external to the tube with the light passing through the walls, the interior volume of the tube, and the lens element.

2. The reaction vessel of claim 1 wherein the tube walls opposed to the open end taper toward the central axis as they move away from the open end.

3. The reaction vessel of claim 1 wherein outer surfaces of the lens element conform to the surface of a sphere.

4. The reaction vessel of claim 1 wherein the lens element is a sapphire sphere.

5. The reaction vessel of claim 1 wherein the tube is a molded thermoplastic polymer.

6. A spectrometer assembly comprising:

(a) a plurality of translucent tubes having walls defining an interior volume open at one end each having caps sized to removably seal the open end of the tubes, the caps each containing an aperture holding a lens element sealing the aperture, the lens elements oriented, when the caps are in place on the tubes, to allow passage of light along central axes from a spectrometer light source external to the tube with the light passing through the walls, the interior volume of the tubes, and the lens elements;

(b) a spectrometer lamp positioned to project light along the axes when the tubes are positioned adjacent to the spectrometer lamp; and (c) a detector means collecting light after it has passed through the interior volume of the tubes along the axis to detect attenuation of the light by material held in the interior volume.

7. The spectrometer assembly of claim 6 wherein the detector means is a photographic film.

8. The spectrometer assembly of claim 6 wherein the detector means is a photoelectric detector.

9. The spectrometer assembly of claim 8 wherein the detector means includes a shroud sized to receive the cap with the detector aligned with the lens element.

10. The spectrometer assembly of claim 6 further including an alignment block having spaced channels sized to receive an outside surface of the walls of the tubes, the channels allowing the passage of light along the central axes of the tubes between a bottom and top of the alignment block, the block positioned between the light and the detector.

* * * * *